United States Patent [19]

Crout et al.

[11] E Re. 28,614

[45] Reissued Nov. 18, 1975

[54] METHOD AND APPARATUS FOR TRANSPORTING AND LAUNCHING AN OFFSHORE TOWER

[75] Inventors: Jesse W. Crout; Albert M. Koehler; Larry K. Shaw, all of Houston, Tex.

[73] Assignee: Brown & Root, Inc., Houston, Tex.

[22] Filed: Jan. 9, 1975

[21] Appl. No.: 539,725

Related U.S. Patent Documents

Reissue of:

[64] Patent No.: 3,823,564
Issued: July 16, 1974
Appl. No.: 336,276
Filed: Feb. 27, 1973

[52] U.S. Cl. ..... 61/46.5; 114/0.5 F; 114/43.5
[51] Int. Cl.[2] ..... E02B 17/02; B63B 35/40
[58] Field of Search ..... 61/46.5, 65; 114/0.5 D, 114/0.5 F, 43.5

[56] References Cited

UNITED STATES PATENTS

| | | | |
|---|---|---|---|
| 3,054,267 | 9/1962 | Alcorn et al. | 61/46.5 |
| 3,413,946 | 12/1968 | Von Schultz | 114/.5 D |
| 3,633,369 | 1/1972 | Lawrence | 61/46.5 |

FOREIGN PATENTS OR APPLICATIONS

| | | | |
|---|---|---|---|
| 1,487,498 | 5/1967 | France | 61/46.5 |

*Primary Examiner*—Jacob Shapiro
*Attorney, Agent, or Firm*—James E. Cockfield

[57] ABSTRACT

A method and apparatus for transporting and launching an offshore tower. The apparatus according to the invention comprises a watertight buoyancy means for supporting an offshore tower in a generally horizontal transporting posture substantially above the surface of the body of water and subsequently controllably righting the offshore tower onto the bed of the body of water at a preselected marine site. The buoyancy means is connected along the lateral extent of the offshore tower by a plurality of spaced connecting assemblies. The watertight buoyancy means is interiorly compartmented with bulkheads to facilitate buoyancy control and righting of the offshore tower within the body of water. The lowermost connecting assembly between the offshore tower and the buoyancy means consists of at least one pivotal assembly so that the buoyancy means may be controllably pivoted away from the offshore tower following a righting operation.

One specific embodiment of the transport and launch apparatus includes first and second tubular, selectively variable, buoyancy members. Each buoyancy member includes a unitary tubular section and a bifurcated tubular section connected to one end thereof. Clamping assemblies are provided along the lateral extent of the first and second tubular buoyancy members for releasably connecting the buoyancy members to the lateral face of an offshore tower. The bifurcated tubular sections may each be provided with transversely extending bridges for supporting pivotal connection assemblies for pivotally connecting a base portion of the transport and launch apparatus to a base portion of the offshore tower.

The method of transporting and launching an offshore tower according to the invention comprises the steps of floating an offshore tower to a preselected marine site upon a tubular buoyancy means, controllably righting the offshore tower within a body of water, lowering the offshore tower onto the water bed and releasing the tubular buoyancy means from a lateral surface of the offshore tower by pivoting the buoyancy means away from the offshore tower about a pivotal connection at the base of the offshore tower. The tubular buoyancy means is then refloated and transported back to an offshore tower fabrication yard for subsequent reuse.

32 Claims, 33 Drawing Figures

METHOD AND APPARATUS FOR TRANSPORTING AND LAUNCHING AN OFFSHORE TOWER

Matter enclosed in heavy brackets [ ] appears in the original patent but forms no part of this reissue specification; matter printed in italics indicates the additions made by reissue.

BACKGROUND OF THE INVENTION

This invention relates to a method and apparatus for transporting and launching an offshore tower. More particularly the invention relates to an improved launching vessel and process for safely and efficiently positioning a large offshore tower upon the bed of a body of water and then recovering the vessel for subsequent reuse.

In the past, steel frame towers have been advantageously utilized in a multiplicity of marine situations. Illustrative examples of past and present offshore tower utilities include supports for radar or sonar stations, light beacons, scientific and exploration laboratories, etc. Additionally, offshore towers are frequently employed in the oil industry in connection with offshore drilling, production and distributing operations.

In an attempt to keep pace with burgeoning worldwide power requirements drilling for minerals in formations situated within the bed of a body of water has in the recent past become an extremely active and important segment of the oil industry. In this connection, creative scientists and engineers have made tremendous strides with respect to exploration, drilling, producing, storing and distributing activities in a marine environment often referred to as the last earth frontier. Notwithstanding, however, successes of the recent past, significant challenges remain in this infant segment of the oil industry.

In the initial stages of offshore development, exploration and drilling operations were conducted on the continental shelf in locations of relatively shallow water depths such as from a few feet to 100 or more feet. Productive shallow water areas exist, for example, along the near shore portions of the Gulf of Mexico. It has more recently, however, been the accepted practice to explore and develop sites in water depths from a few hundred to a thousand or more feet. Examples of deeper water fields may be found along the Pacific Coast continental shelf, the Artic regions, the North Sea, etc.

In order to exploit mineral resources which exist below such substantial depths of water, tower designs which have been reliable and effectively utilized in the past have undergone redesign for prolonged high stress, deep water use. In this connection, recently designed offshore towers are truly enormous structures presenting significant engineering challenges not only from an initial design aspect but from a subsequent transportation and erection point of view.

At least one presently known method for transporting and erecting an offshore tower comprises interiorly segmenting the tower legs, with bulkheads and floating the tower to an offshore site upon the buoyant tower legs. At the working site the compartments are flooded to sink the tower to the bed of the body of water.

While this technique has been utilized with at least a degree of success, increasing attention has been focused upon separation of the tower and the apparatus for transporting and launching it once the tower has been erected. In this connection if a transport and launch apparatus may be repetitively used substantial savings may be realized in connection with the transport and launch structure per se. Moreover, removing dead weight steel from a tower once launched will facilitate resistance of the tower to hydrodynamic and seismic forces.

At least one previously known transport and launch apparatus which has been designed to be recoverable includes a generally rectangular structure comprising two lower floats composed of three parallel tubes and a pair of upper floats connected to the lower floats by vertically extending columns. An offshore tower to be transported and launched is coaxially held within the surrounding floatation structure by releasable connections mounted upon cross arms extending between the floats.

While such a structure provides a degree of theoretical appeal, room for significant improvement remains. In this connection it would be desirable to provide a simplified structure which would minimize the amount of material used for the transport and launch apparatus per se. Further it would be desirable to lower the profile of the offshore tower with respect to the surface of the body of water during transportation to increase stability and minimize wind resistance. It would also be desirable to enhance the ability of the transport and launch apparatus to be towed along the surface of the body of water. Still further it would be highly desirable to provide a transport and launch apparatus which may be released from a connecting relationship with an erected offshore tower while minimizing the possibilities of the transport and launch apparatus being hydrodynamically driven into the tower following the releasing operation. Additionally, it would be desirable to provide a method and apparatus for launching an offshore tower wherein the erecting procedure may be facilitated from a safety and predictability point of view.

OBJECTS AND SUMMARY OF THE INVENTION

Objects

It is therefore a general object of the invention to provide a novel method and apparatus for transporting and launching an offshore tower which will obviate or minimize problems of the type previously described.

It is a particular object of the invention to provide a novel method and apparatus for controllably transporting and launching an offshore tower within a body of water.

It is another object of the invention to provide a novel method and apparatus for transporting and launching an offshore tower which will minimize hazards to equipment and personnel during a launching operation.

It is still another object of the invention to provide a novel method and apparatus for transporting and launching an offshore tower which will facilitate towing of the offshore tower within a body of water.

It is yet another object of the invention to provide a novel method and apparatus for transporting and launching an offshore tower wherein the utilization of structural components in the transport and launch apparatus per se may be minimized.

It is a further object of the invention to provide a novel method and apparatus for transporting and launching an offshore tower wherein the apparatus may be removed from the offshore tower following a launch sequence for reuse in subsequent operations.

It is still a further object of the invention to provide a novel method and apparatus for transporting and launching an offshore tower wherein the apparatus may be quickly removed from the offshore tower following a launching operation.

It is yet a further object of the invention to provide a novel method and apparatus wherein the apparatus may be reliably removed from the offshore tower following a launching operation without structurally damaging the offshore tower.

It is still yet a further object of the invention to provide a novel method and apparatus for transporting and launching an offshore tower which will be highly rugged in structural design of the type capable of withstanding strong hydrodynamic forces during a transport and launch operation.

BRIEF SUMMARY OF THE INVENTION

An offshore tower transport and launch apparatus according to a preferred embodiment of the invention which is suitable to achieve at least some of the foregoing objects comprises a watertight buoyancy means for supporting an offshore tower in a generally horizontal transporting posture substantially above the surface of a body of water and subsequently controllably righting the offshore tower onto the bed of the body of water at a preselected marine site. The buoyancy means is connected along the lateral extent of the offshore tower by a plurality of spaced connecting assemblies. The watertight buoyancy means is interiorly compartmented with bulkheads to facilitate buoyancy control and righting of the offshore tower within the body of water. The lowermost connecting assembly between the offshore tower and the buoyancy means consists of at least one pivotal assembly so that the buoyancy means may be controllably pivoted away from the offshore tower following a righting operation.

One specific embodiment of the transport and launch apparatus includes a first and second tubular buoyancy member operable for attachment to a lateral surface of an offshore tower. Each of the buoyancy members includes a unitary tubular section and a bifurcated tubular section connected to one end thereof. Means are connected to the first and second tubular buoyancy members for operably controlling the buoyancy thereof whereby an offshore tower may be transported to a marine site in a generally horizontal posture substantially above the surface of a body of water and launched at the preselected marine site into a generally vertical posture within the body of water.

A method for transporting and launching an offshore tower according to a preferred embodiment of the invention includes the steps of floating an offshore tower in a generally horizontal posture to a preselected marine site upon buoyancy means, flooding the buoyancy means to lower the offshore tower into the body of water, releasing the buoyancy means from connection along the lateral extent of the offshore tower including the step of pivoting the buoyancy means about a pivotal connection between a lowermost portion of the buoyancy means and a base portion of the offshore tower, releasing the buoyancy means from the offshore tower at the pivotal connection and towing the transport and launch apparatus back to a fabrication yard.

THE DRAWINGS

Other objects and advantages of the present invention will become apparent from the following detailed description taken in conjunction with the accompanying drawings wherein.

Figure 10A:
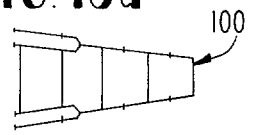
Figure 10B:
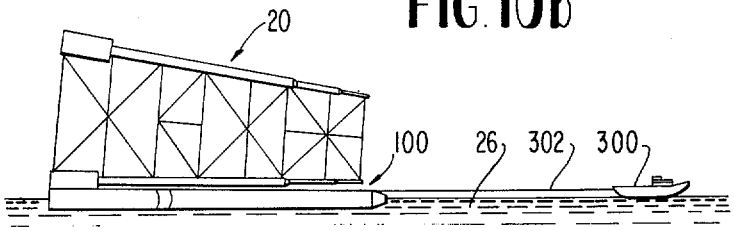
Figure 11A:
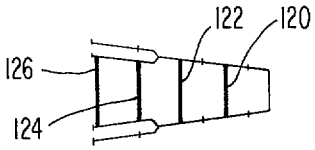
Figure 11B:
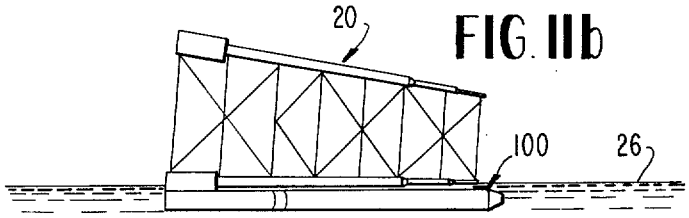
Figure 12A:
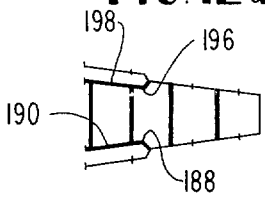
Figure 12B:
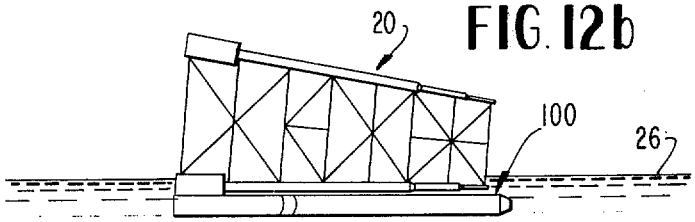
Figure 13A:
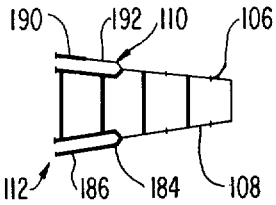
Figure 13B:
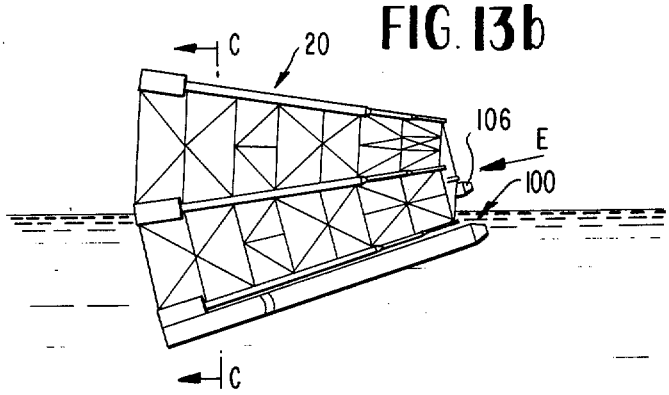
Figure 13C:
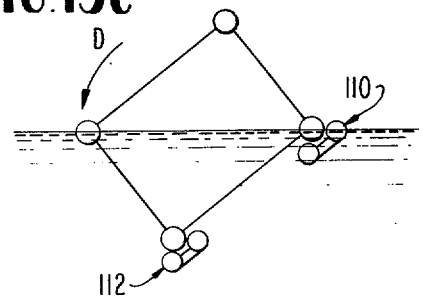
Figure 13D:
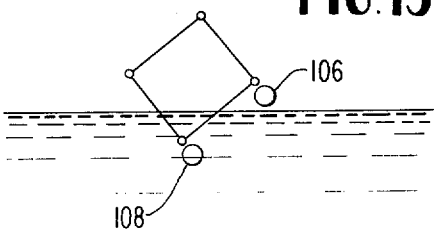
Figure 14A:
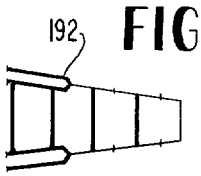
Figure 14B:
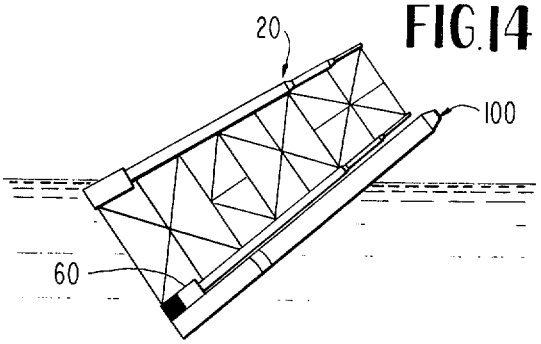
Figure 15A:
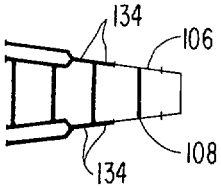
Figure 15B:
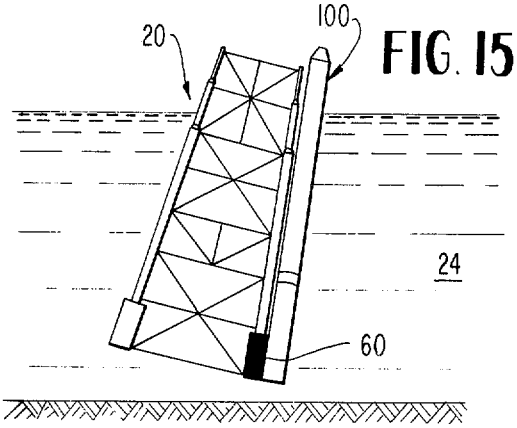
Figure 16A:
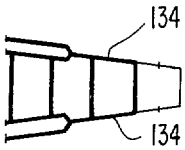
Figure 16B:
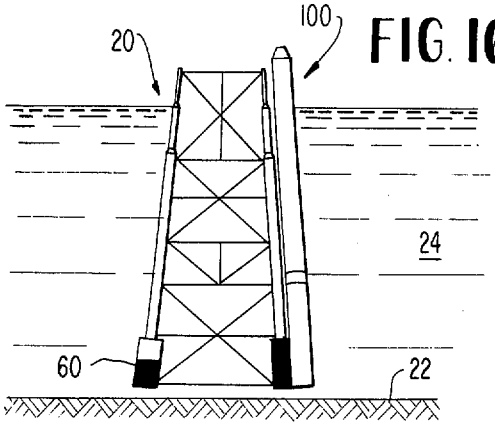
Figure 17:
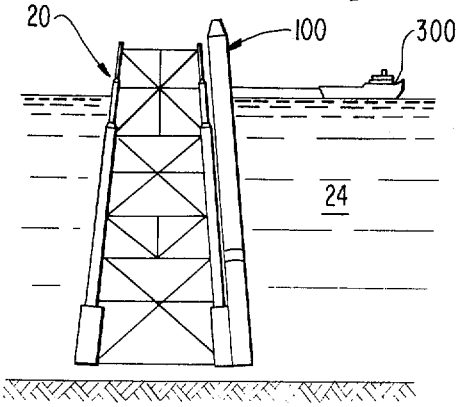
Figure 18:
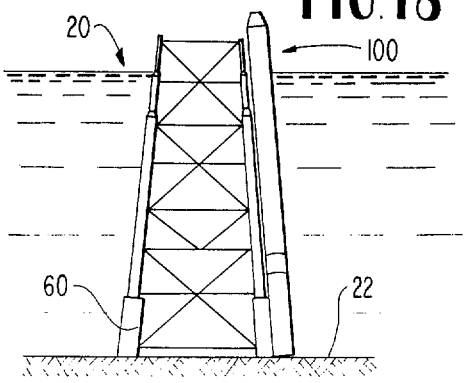
Figure 19:
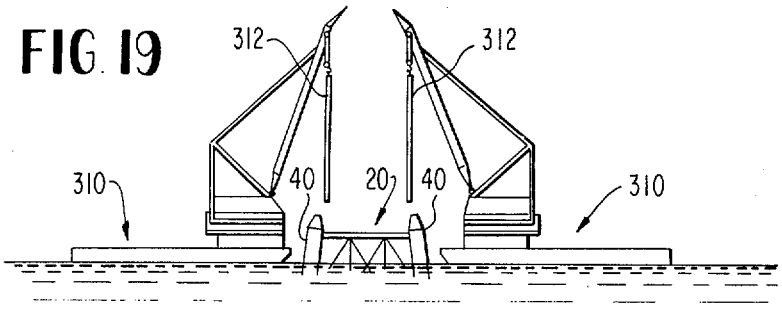
Figure 20A:
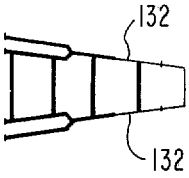
Figure 20B:
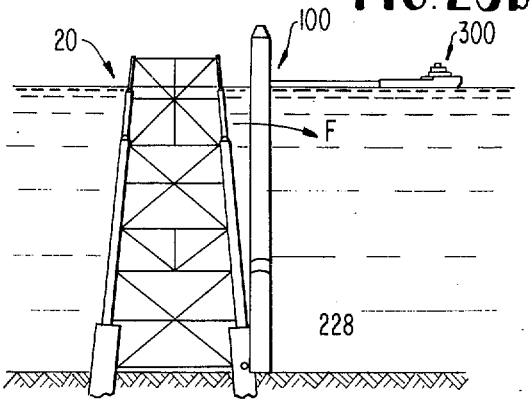
Figure 21:
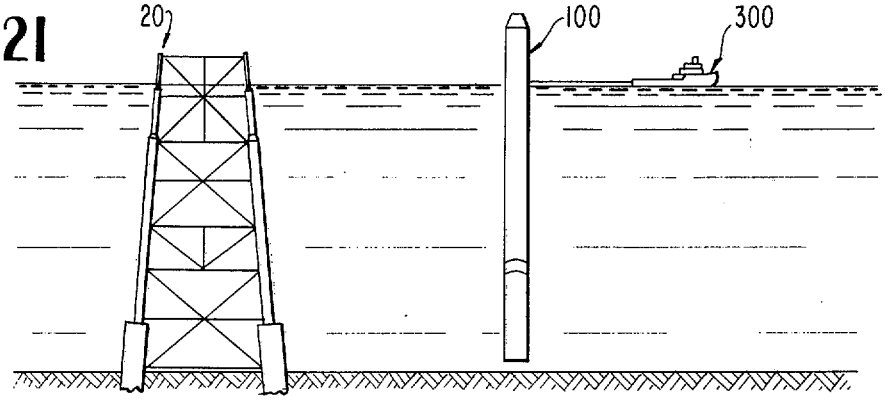
Figure 22:
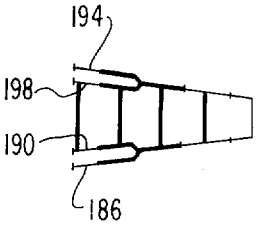
Figure 22B:
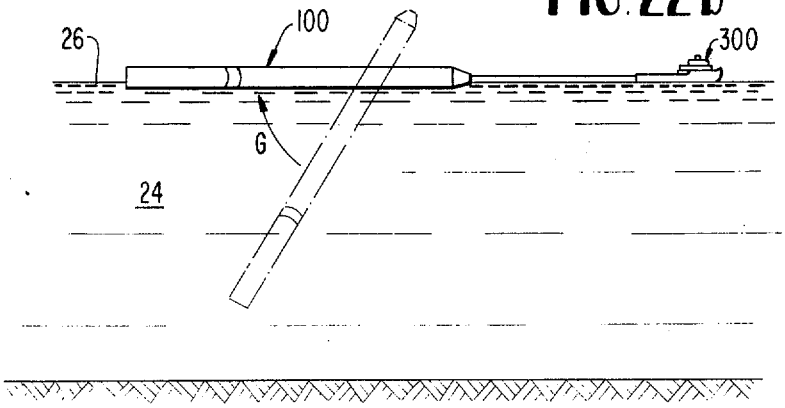

FIGS. 10–22 disclose a process for transporting and launching an offshore tower according to the subject invention as follows:

FIGS. 10A–B disclose an offshore tower positioned upon a transport and launch apparatus for transport by one or more towing vessels or tugs to a preselected marine site;

FIGS. 11A–B disclose ballasting transverse interconnecting members of the transport and launch apparatus as indicated in heavy lines in FIG. 11A to lower the profile of the tower and launch apparatus within the body of water;

FIGS. 12A–B disclose ballasting of the inboard tanks of the bifurcated base sections to further lower the profile of the tower within the body of water;

FIGS. 13A–B disclose completely ballasting one of the port or starboard outboard tanks of the bifurcated base sections and partially flooding the other of the port or starboard outboard tanks of the bifurcated base sections to induce an axial quarter roll of the offshore tower as depicted in FIGS. 13B–D;

FIGS. 14A–B disclose ballasting the remainder of the other of the port or starboard outboard tanks of the bifurcated base sections and a portion of the base tanks of the offshore tower and the consequent rotation or pitch of the tower into the body of water;

FIGS. 15A–B disclose ballasting a portion of the unitary leg sections of the transport and launch apparatus and the base tanks of the offshore tower to rotate or pitch the tower toward a vertical posture;

FIGS. 16A–B disclose further ballasting of the unitary leg sections of the transport and launch apparatus and a further pair of base tanks of the offshore tower to bring the tower axis generally into vertical alignment with the surface of the body of water;

FIG. 17 discloses towing of the tower while in the vertical posture, for final positioning and orientation of the tower at the offshore site;

FIG. 18 discloses sinking the tower onto the bed of the body of water;

FIG. 19 discloses placing and driving pin piles through the tower base tanks to pin the tower to the bed of the body of water;

FIGS. 20A–B disclose disconnecting ties between the lateral surface of the tower legs and the transport and launch apparatus and partially deballasting the transport and launch apparatus to induce a rotation thereof upon base pivotal connecting assemblies into a generally vertical posture;

FIG. 21 discloses towing the transport and launch apparatus at the upper end thereof away from the tower, and FIGS. 22A–B disclose deballasting sections of the transport and launch apparatus to raise the apparatus to a horizontal posture upon the surface of the body of water for transportation back to an offshore tower fabrication facility.

DETAILED DESCRIPTION

General Tower Structure

Figure 1:
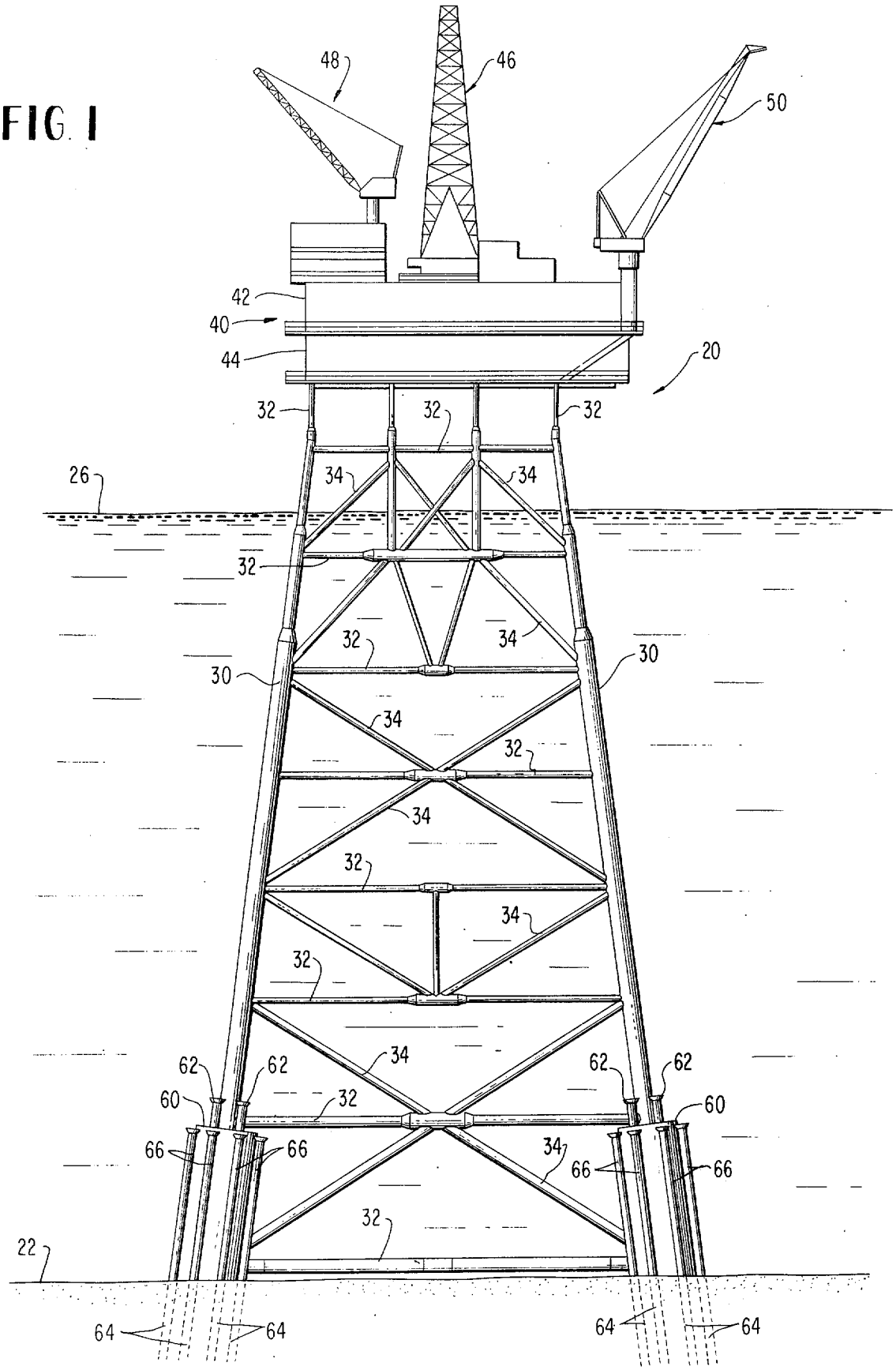
FIG. 1 is a side elevational view of a completed offshore tower resting upon the bed of a body of water and projecting above the surface thereof for supporting a multi-deck platform suitable for sustained offshore drilling, production and secondary recovery operations.
Figure 2:
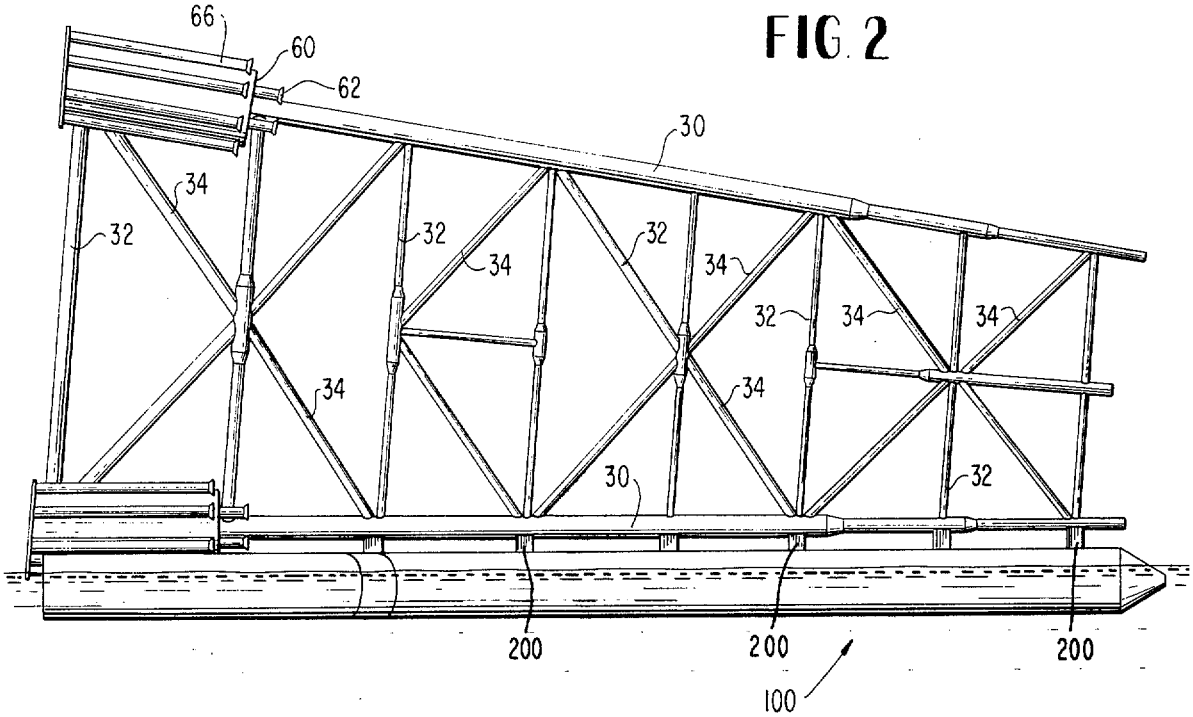
FIG. 2 is a side elevational view of a base portion of the offshore tower positioned for transportation to a preselected marine location upon a transport and launch apparatus forming the subject matter of the instant invention.

Referring now to the drawings and more particularly to FIG. 1 thereof a typical steel frame offshore tower 20 is illustrated in a functionally operative posture situated upon the bed 22 of a body of water 24.

The tower 20 includes a plurality of supporting columns or legs 30 which typically slope inwardly as they project upwardly and are axially dimensioned to extend between the water bed 22 and the water surface 26 for supporting a working platform 40.

The platform 40 may be connected to the tower legs through generally vertical riser columns 32 which facilitate construction of the platform and also ensure that the platform is sufficiently elevated to be statistically free of direct hydrodynamic loading in the event of rough seas.

The offshore tower 20, as previously discussed, may be utilized in a multiplicity of applications such as, for example, to support radar stations, light beacons, marine exploration labs and the like. More predominantly, however, offshore towers of the type illustrated and described are utilized in the offshore oil industry to support platforms for drilling, producing, storing, distributing and secondary recovery operations.

In this connection the platform 40 frequently is composed of at least two decks including a main deck 42 and a cellar deck 44. The main deck may serve to support one or more drilling rigs 46 which may be suitable to drill from a plurality of locations and inclinations with respect to the platform 40. Further, the main deck may be provided with one or more pedestal cranes 48 and 50, mud tanks and various other equipment suitable for sustaining a continuous drilling operation. The cellar deck 44 typically contains housing units, generators, compressors, control centers, test facilities and the like.

The supporting columns or legs 30 are laterally stabilized by a plurality of transversely extending brace members 32. Vertical tower loading is distributed throughout the structure by a network of struts 34 interconnecting the braces 32 and legs 30.

An enlarged tank or cam 60 is coaxially positioned around the base of each of the tower legs 30 and serves primarily as a storage container. Secondarily, however, the tanks 60 may be utilized to advantage in a launching operation. Such a launching operation will be discussed in detail hereinafter.

The tower 20 is further provided at the base of each leg 30 with a plurality of pinning pile guides 62 which extend through the tanks 60. The guides 62 are suitable to receive pinning piles which may be driven in place immediately following positioning the tower upon the water bed.

Once the tower is pinned in an upright posture, permanent piles 64 are driven through a plurality of pile guides 66 which are affixed about the periphery of the tanks 60.

The dimensions of the pilings 64 and guides 66 are such that a concentric volume is formed between the exterior of the piling and the interior of the jacket or casing. This volume may be suitably filled with grouting or the like to fixedly couple the jackets to the pilings and thus secure the tower structure to the bed of the body of water.

In most instances grouting alone is sufficient to fixedly interconnect the pilings with the outer jackets. In some instances, however, it may be desirable to weld annular rings (not shown) around the outer periphery of the piling and the inner periphery of the jacket. The rings may be provided with sloping fingers designed to bind with the grouting and ensure a secure interlock between the guides and the pilings. For a more detailed description of the above outlined grouting technique and structure reference may be had to a United States Hauber et al. Pat. No. 3,315,473 issued Apr. 25, 1967 and assigned to the assignee of the subject application. The disclosure of the Hauber et al. patent is hereby incorporated by reference as though set forth at length.

The tower and platform of the foregoing description are intended to be merely illustrative of currently utilized offshore tower designs and do not per se form a part of the subject transport and launch invention which will now be discussed in detail.

Transport and Launch Apparatus

A transport and launch apparatus according to the present invention suitable to transport and launch a tower of the type previously described is disclosed in FIGS. 2–5.

More specifically, the transport and launch apparatus comprises a watertight buoyancy means 100 suitable to support the offshore tower in a generally horizontal posture substantially above the surface 26 of the body of water 24. The buoyancy means includes a first watertight tubular buoyancy member 102 and a second watertight buoyancy member 104. The tubular buoyancy members 102 and 104 include unitary tubular sections 106 and 108, respectively, and bifurcated tubular sections 110 and 112 respectively.

The free ends of the unitary tubular sections 106 and 108 are enclosed with conically-shaped nose sections 114 and 116 which facilitate towing of the apparatus on the body of water.

The first and second tubular buoyancy members 102 and 104 are interconnected by a plurality of transversely extending tubular buoyancy members 118, 120, 122, 124 and 126. Transverse buoyancy members 118, 120 and 122 are fixedly connected between the unitary tubular sections 106 and 108 while transverse buoyancy members 124 and 126 interconnect the bifurcated tubular sections 110 and 112.

The axial dimensions of the transverse tubular portions 118–126 are such that a central longitudinal axis 128 of the first tubular buoyancy member 106 is slopingly inclined with respect to a central longitudinal axis 130 of the second tubular buoyancy member from the bifurcated ends of the tubular buoyancy members toward the free ends thereof with a slope compatible with that of the tower legs 30 of a tower to be transported and launched by the apparatus.

Figure 5:
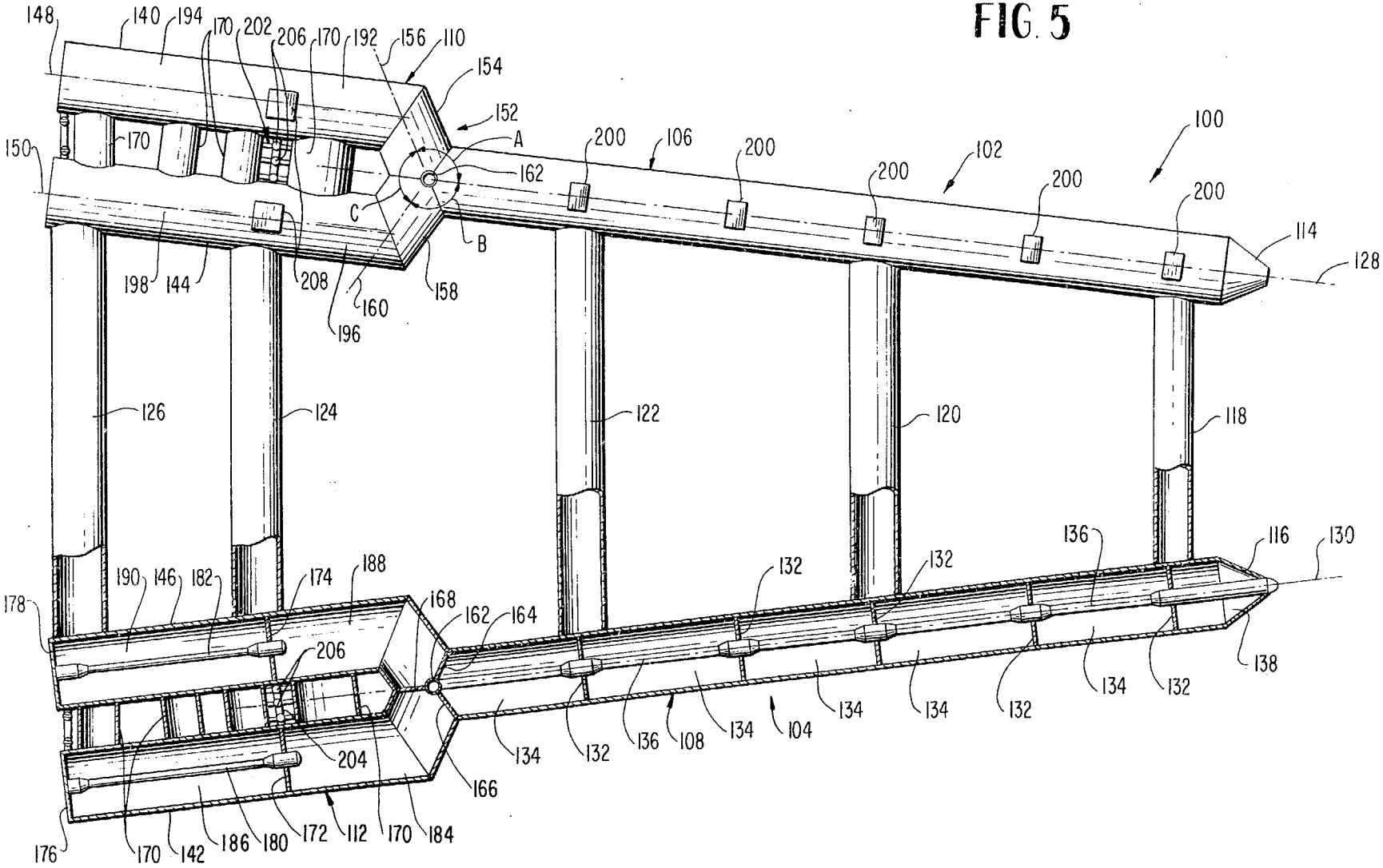
FIG. 5 is a plan view of a transport and launch apparatus of the subject invention, partially broken away, including two elongate tubular members fashioned with unitary tubular sections and bifurcated base sections and an inner concentric reinforcing column between a plurality of longitudinally spaced bulkheads.

The first and second unitary tubular sections 106 and 108 of the first and second buoyancy members are provided with a plurality of transversely extending bulkheads 132 along the axial length thereof (note the broken away portion of FIG. 5). The bulkheads 132 serve to divide the tubular portions 106 and 108 into a plurality of generally uniformly dimensional ballast compartments 134.

The bulkheads 132 are supported by a column 136 which coaxially extends throughout the length of the unitary tubular portions 106 and 108.

The interior coaxial column 136 provides columnar support for the bulkheads 132 and also serves as a conduit for carrying control lines (not shown) to each of the compartments 134. More specifically, conventional ballasting and deballasting valves and the control and supply lines therefore are connected into each of the compartments 134 so that ballast within each compartment may be varied by convention and well known techniques.

In addition to the buoyancy chambers 134 the transverse tubular members 118–126 are fitted with ballasting and deballasting valves and remote controls. Ballasting and deballasting of each of the chambers may be monitored from a control chamber 138.

Bifurcated tubular sections 110 and 112 are connected to the unitary tubular portions 106 and 108, as previously mentioned. Both the bifurcated tubular sections 110 and 112 are similarly fabricated and include outboard watertight tubular members 140 and 142 and inboard watertight tubular members 144 and 146, respectively.

Referring now particularly to bifurcated tubular section 110 the outboard 140 and inboard 144 tubular members have mutually parallel central longitudinal axes 148 and 150, respectively. The parallel extending tubular members 140 and 144 are interconnected at one of the ends thereof to the end of the unitary tubular section 106 by a transversely extending bight or bridge section 152.

The bridge 152 includes a first generally transverse member 154 extending between one end of the tubular member 140 and the unitary tubular section 106 and has a central longitudinally extending axis 156 which intersects the axes 128 and 148. In a similar manner a generally transverse member 158 extends between one end of the tubular portion 144 and the unitary tubular portion 106 and has a longitudinally extending axis 158 intersecting axes 128 and 150. The angular relationship between axes 128–156, 128–160 and 156–160 are all approximately of equal magnitude. In other words, angles A, B and C are each approximately 120°.

In order to provide structural support at the junction of the transverse members 154 and 158 with the tubular member 106, a structural key 162 is normally projected through the intersection of axes 128, 156 and 160. Generally semicircular bulkhead plates 164, 166 and 168 (note bifurcated portion 112), are then interconnected between the key 162 and the intersecting surfaces of the cylindrical tubular members.

The parallel tubular members or tines 140 and 144 are united and ruggedized by being fixedly interconnected by a plurality of transversely extending braces 170.

As previously stated the construction of the bifurcated tubular section 112 is identical with that of bifurcated tubular section 110 and therefore the discussion with respect to section 110 is equally applicable with respect to that of section 112 and vice versa.

In this connection, the bifurcated section 112, as shown in a broken away view, discloses that the parallel legs 142 and 146 are provided with transversely extending bulkheads 172 and 174, respectively, to divide each leg into an upper and lower buoyancy chamber. Moreover, the free ends of each of the legs 142 and 146 are provided with bulkheads 176 and 178, so as to define a lowermost watertight ballast chamber.

Cylindrical tubular columns 180 and 182 are interconnected between the bulkheads 172–176 and 174–178 to reinforce the bulkheads and provide access for control systems utilized to actuate and deactuate ballast and deballasting valves and conduits (not shown) of a conventional type suitable to regulate the buoyancy of the interior chambers 184, 186, 188 and 190.

The interior structure of the bifurcated section 110 is identical with that as just described with respect to bifurcated section 112 and comprises interior buoyancy chambers 192, 194, 196 and 198.

From the plan view shown in FIG. 5 it will be appreciated that the first and second tubular buoyancy members 102 and 104 may be roughly described as defining a tuning fork shape in which the base of the tuning forks are formed by the unitary tubular sections 106 and 108 and the tines of the tuning forks are formed by the generally parallel tubular members 140–144 and 142–146. Moreover, when each of the generally tuning fork-shaped buoyancy members 102 and 104 are interconnected by the plurality of transversely extending buoyancy chambers 118–126, it may generally be stated that the transport and launch apparatus assumes an overall truncated A-shaped configuration.

As previously discussed, the foregoing described transport and launch apparatus is designed to transport an offshore tower 20 in a generally horizontal posture over the surface of the body of water (note FIGS. 2–4) and erect the tower in a generally vertical posture upon the bed of a body of water (note FIG. 1). In order to achieve these functions it is necessary to connect the offshore tower 20 with the transport and launch apparatus 100. In this regard a plurality of normally extending columns 200 are disposed along the upper lateral surface of the unitary tubular members 102 and 104 (note FIGS. 2, 4 and 5). These columns extend between and serve to rigidly interconnect the tubular members 102 and 104 with legs 30 of a tower 20 to be transported.

The base portion of the tower 20 may be secured to the transport and launch apparatus 100 by securing adjacent tanks 60 between the tines of the bifurcated sections 110 and 112. To facilitate this attachment bridging assemblies 202 and 204 are interconnected between adjacent transverse braces 170 of the sections 110 and 112 respectively. The bridging assemblies 202 and 204 include a plurality of normally extending pillars 206 which are suitable to project upwardly and directly connect with the tanks 60 of the tower structure 20.

Although bridging assemblies 202 and 204 are preferred, alternatively columns 208 may be utilized which are designed to extend directly between the tines of the bifurcated sections and the tanks of the offshore tower.

The lowermost portion of the tower 20 is connected to the transport and launch apparatus 100 by a pivotal assembly such as specifically illustrated in FIGS. 3 and 6–9.

Figure 3:
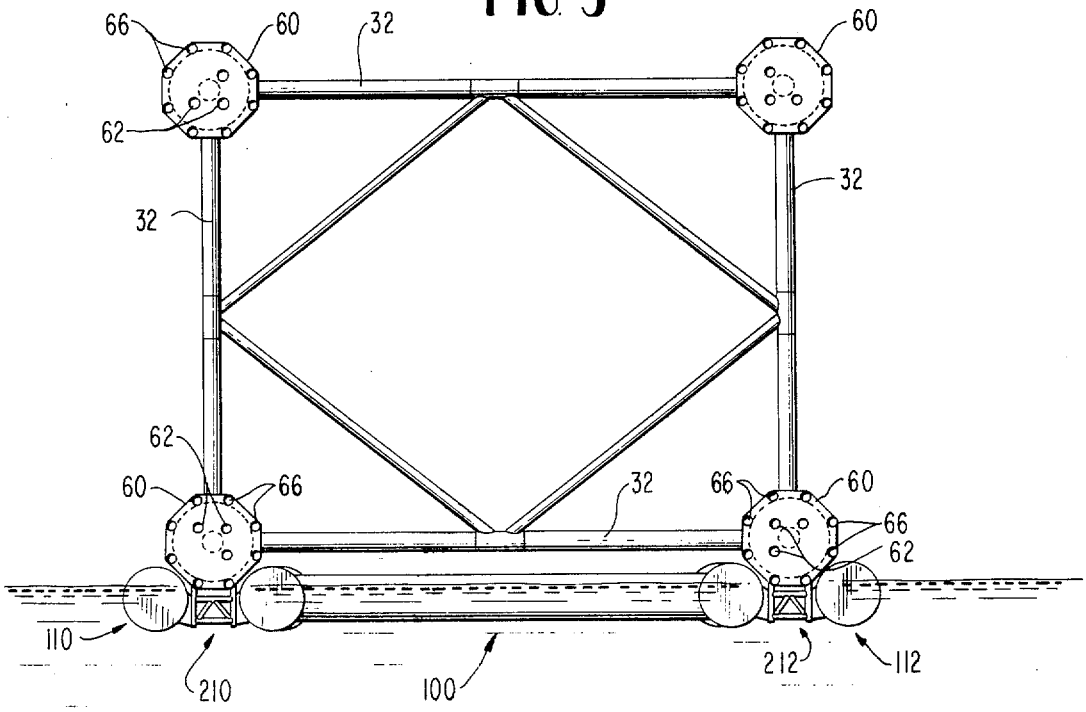
FIG. 3 is an end view of the base of the offshore tower and transport and launch apparatus disclosed in FIG. 2.
Figure 4:
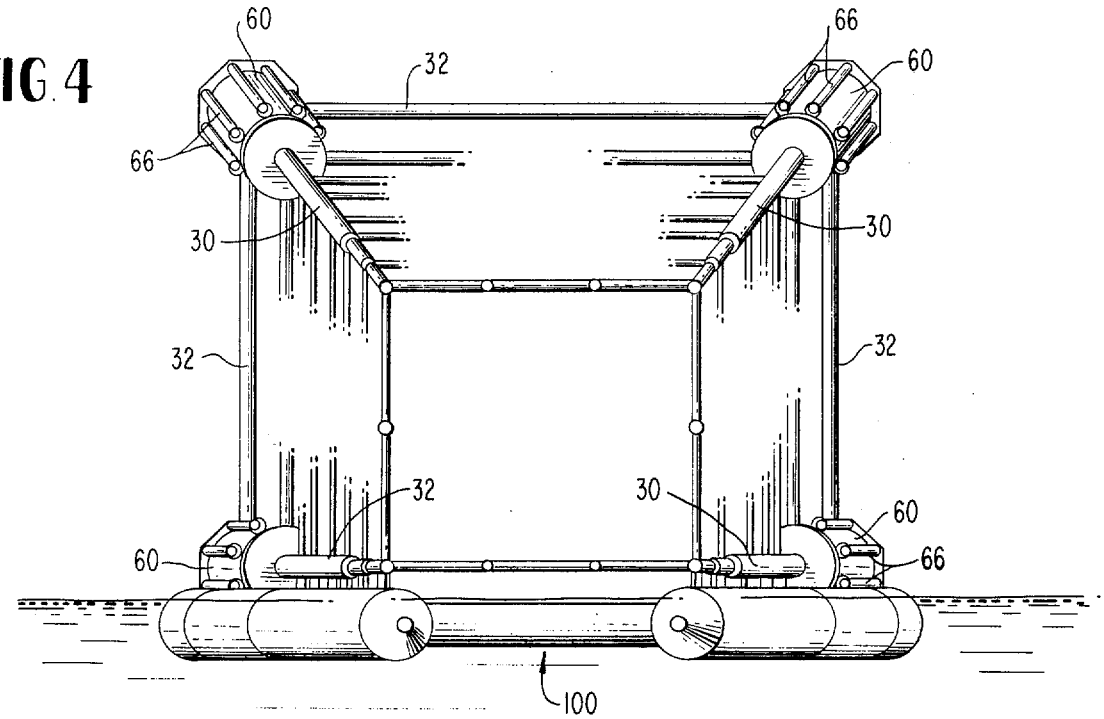
FIG. 4 is an end view of the top of the offshore tower and transport and launch apparatus disclosed in FIG. 2.

With reference to FIG. 3, and as previously mentioned, it will be seen that the tank structure 60 including the surrounding pile guides 66 may nestle between the outboard and inboard tines 140–144 and 142–146 respectively of the bifurcated portions of each of the tubular buoyancy members. The tanks 60 at the lowermost ends thereof are supported upon bridging assemblies 210 and 212 which span between the outermost ends of the bifurcated members 110 and 112.

Figure 6:
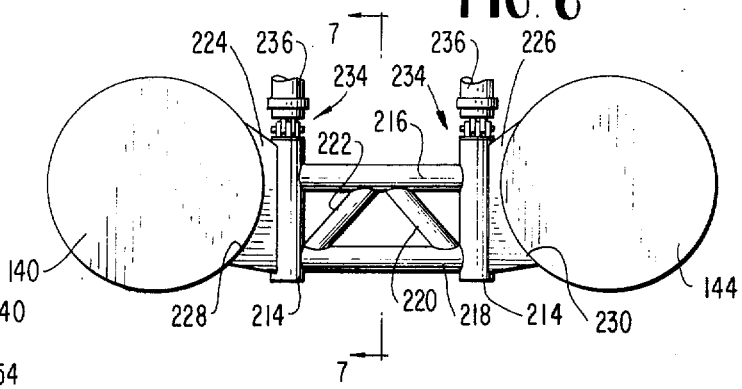
FIG. 6 is a partial detailed view of one embodiment of a pair of pivotal connecting assemblies for mounting a base portion of an offshore tower leg with a bifurcated base section of the transport and launch apparatus.
Figure 7:
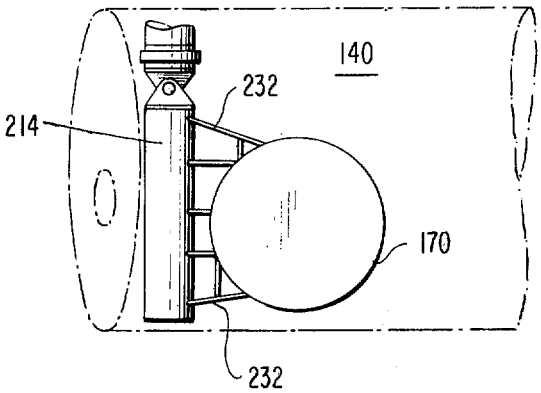
FIG. 7 is a cross-sectional view taken along section line 7—7 in FIG. 6.

With reference specifically to FIGS. 6 and 7 it will be seen that the bridging assembly 210 includes a pair of columns 214 which are interconnected by upper and lower transverse braces 216 and 218, respectively. The braces in turn are supported by struts 220 and 222. The columns 214 are fixedly connected to the outer periphery of the buoyancy tines 140 and 144 by flat supporting plates 224 and 226. The supporting plates are provided with coped ends 228 and 230 so as to provide a continuous weld abutment surface between the columns 214 and the buoyancy tines 140 and 144. Moreover, the columns 214 are supported by a plurality of gusset webs 232 (note FIG. 7) which transversely extend between the columns 214 and brace 170.

Each of the columns 214 is provided at the upper surface thereof with a pivotal assembly 234 between the columns and extensions 236 which are fixedly connected to the lowermost portion of the tanks 60.

Figure 8:
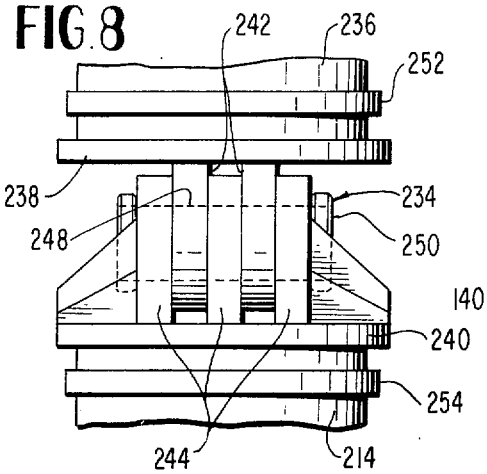
FIG. 8 is a detailed view of one of the pivotal connecting assemblies including a circumferentially extending shaped charge to sever the pivotal connecting assembly between the transport and launch apparatus and the offshore tower.
Figure 9:
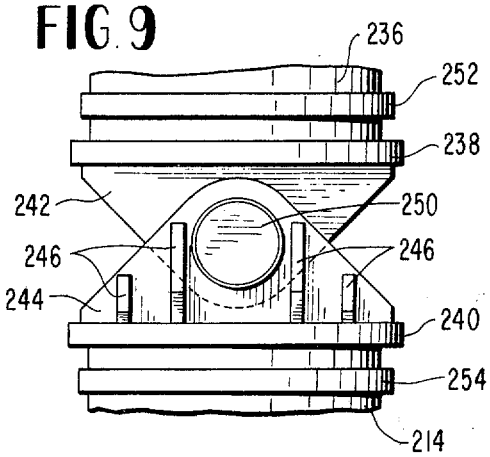
FIG. 9 is a detailed side elevational view of the pivotal assembly disclosed in FIG. 8.

By reference now to FIGS. 8 and 9, there will be seen detailed views of the pivotal connecting assemblies 234. More specifically extension 236 is provided on an end thereof with a flat plate 238. In a like manner, the upper end of the columns 214 is provided with a flat support plate 240. Normally projecting from plates 238 and 240 are apertured hinge leaves 242 and 244, respectively. The outermost leaves 244 are supported by triangular gusset braces 246. The hinge leaves 242 and 244 are intermeshed to form an aligned aperture 248 suitable to receive a heavy duty pivot pin 250.

By the provision of the foregoing described supporting structure, a tower 20 may be fixedly attached to a transport and launch apparatus 100 for towing along the surface 26 of a body of water.

The towing operation is greatly facilitated by the transport and launch design in at least two particulars. In this connection, as previously mentioned, the free ends of the unitary sections 106 and 108 are provided with conical end caps 114 and 116 to reduce water resistance to forward motion of the transport apparatus. Moreover, in plan view, the transport and launch structure is generally A-shaped. By the provision of this shape towing through the water is aided in that axial alignment of the apparatus 100 with respect to the direction of travel is automatically maintained. In the connection, if the structure were a rectangular configuration, there would be a continual tendency for the axis of the tower to shift to the port and starboard and become misaligned. Such misalignment would materially increase towing difficulties in an open sea. The A-shaped configuration of the subject invention, however, is automatically self aligning in that the sloping sides of the A-shaped apparatus will counter tendencies of the apparatus to rotate broadside under tow.

Once the tower has been towed to a desired preselected marine site, the next step is to launch the tower into a generally vertically posture upon the water bed as depicted in FIG. 1. The launching operation will be discussed in detail hereinafter. However, for the present it should be noted that once the tower is in a vertical and erect posture resting upon the water bed, it would be highly desirable to remove the transport and launch apparatus 100 quickly. In this connection the transport apparatus has been calculated to provide approximately two-thirds of the wave shear force on the tower. Therefore, it becomes almost impossible to install enough pilings in a short period of time to hold the tower as well as the launch apparatus in place in the event rough sea conditions should arise.

In order to quickly sever the transport and launch apparatus 100 from the tower 20 the columns 200 are each fitted with remotely actuatable circumferentially extending shaped explosive charges. Moreover the columns 206, 214 and 216 may be similarly fitted with remotely actuatable explosive cutting assemblies.

More particularly and with reference to FIGS. 8 and 9, there will be seen circumferentially shaped charges 252 and 254 surrounding the support columns 236 and 214 respectively. The shaped charges may be remotely discharged to sever the columns 214 and 236 and release the transport and launch apparatus 100 from an erected tower. The construction of the shaped charges per se does not form a part of the subject invention and commercially available devices may be utilized.

Transport and Launch Sequence

With articular reference now to FIGS. 10–22, a sequence of transporting, launching and erecting or righting an offshore tower at a preselected marine site according to the present invention is illustrated.

An offshore tower 20 is constructed upon a lateral face of a transport and launch apparatus 100 within a fabrication or graving yard. The yard facility is then flooded which raises the transport and launch apparatus off of pillow frames to floatingly support the tower 20 above the surface of the body of water 26. In this supporting posture the tower structure 20 per se is substantially above the surface of the body of water. Therefore the braces and struts of the tower will not produce drag during a towing operation. However the tower assumes a low enough profile so that wind resistance is minimized and stability maximized.

The ballast chambers within the transport and launch apparatus 100 are substantially devoid of water as depicted by schematic 10A. It will be appreciated, however, that a small amount of ballast may be added to provide proper trim for the transport and launch apparatus.

One or more towing vessels or tugs 300 are then connected to the bow of the transport apparatus 100 by lines 302 to tow the vessel to a preselected marine site. Upon reaching the site, the tower is ready for launching into the body of water 26 and onto the vessel bed 22.

The first step in the launching sequence is to lower the profile of the tower with respect to the surface 26 of the body of water. This may be achieved by flooding transverse ballast chambers 120, 122, 124 and 126 (note FIGS. 11A–B). Further, inboard tanks 188, 190, 196 and 198 may be ballasted to additionally lower the transport and launch apparatus 100 and the tower 20 with respect to the surface of the body of water 26 (note FIGS. 12A–B).

Once the tower 20 has been lowered with respect to the surface of the body of water, it may be preferred, frrm a predictability viewpoint, to roll the tower generally about the central axis thereof a quarter turn. This initial roll may be achieved by flooding outboard tanks 184 and 186 and outboard tank 190 (note FIG. 13A). Whereas more ballast is now provided in outboard tank 184 with respect to its corresponding outboard 192, the tower 20 is carried upon the transport and launch apparatus 100 will predictably roll a quarter of a turn counterclockwise, in the general direction of arrow D. As viewed along directional arrow E (in FIG. 13D) the free end of the unitary tubular member 106 will project out of the body of water (note FIG. 13D) upon completion of the quarter roll. This position, however, is not unduly tender in view of the substantial ballast in the transport and launch apparatus and the presence of a portion of the structural network of the tower which is now beneath the surface of the body of water.

Once the tower has been rotated an initial quarter roll, a counter quarter roll may be induced by ballasting compartment 192 (note FIG. 14A). The transport and launch apparatus 100 and the tower 20 will then assume a generally symmetrical inclined posture within the body of water.

The profile of the transport and launch apparatus and tower may then be lowered by at least partially ballasting the lowermost tower tanks 60 (note FIG. 14B).

In order to further pitch the tower 20 into a generally vertical posture the first two sections 134 of the unitary tubular members 106 and 108 may next be ballasted and the remainder of the tanks 46 adjacent the launch apparatus may also be filled with water (note FIGS. 15A–B).

The structure may be finely ballasted into a vertical posture by adding water to two more additional compartments 134 in the unitary legs 106 and 108 and also ballasting the outer pair of tower tanks 46 (note FIGS. 16A–B).

Following this final righting operation, the tower 20 with the transport and launch apparatus 100 attached thereto is suspended within the body of water 24 with the base of the tower 20 maintained slightly above the water bed 22 (note FIG. 16B).

In this floating posture one or more tugs 300 may be connected to the launch apparatus 100 in order to accurately position the tower 20 within the body of water 24 at the preselected marine site in an orientation which will minimize, based upon predicted current flows, the imposition of hydrodynamic forces onto the tower structure (note FIG. 17). More specifically an angle or corner of the tower 20 is desirably headed into the current to minimize the imposition of broadside hydrodynamic loads.

Once the tower has been accurately positioned and oriented it may be finally lowered onto the water bed 22 by finely ballasting the tanks 60 and the remaining portions of the unitary legs 106 and 108 of the transport and launch apparatus.

As soon as the tower 20 has been brought to rest upon the water bed 22, a pair of derrick barges 310 are pulled alongside the upper portion of the tower 20 and piles 312 are lowered through guides (not shown) extending along the lateral surface of the tower legs 30 and into pinning pile guides 62 (note FIG. 1).

Pinning piles are then driven into the water bed 22 in order to quickly pin the offshore tower 20 to the water bed 22. Once the pinning operation is completed the transport and launch apparatus 100 is desirably removed from the lateral face of the tower 20.

Removal is initiated by actuating shaped charges which surround the supporting columns 200 and 206.

The uppermost ballasting chambers 134 are then blown in order to bring the transport and launch apparatus 100 to slight positive buoyancy in the inclined posture along the lateral face of the tower 20. The slight buoyancy of the transport and launch apparatus 100 will serve to induce pivotal movement of the transport and launch apparatus 100 about the pivotal assemblies 234 in the direction of arrow F (note FIG. 20B). This pivotal procedure may be facilitated by the utilization of one or more towing tugs 300.

Once the transport and launch apparatus 100 is pivoted away from contact with the lateral surface of the tower 20, the shape charges around the pivotal connecting assemblies 234 are actuated to completely sever the transport and launch apparatus 100 from connection with the offshore tower 20.

As soon as the neutrally buoyant transport and launch apparatus 100 is severed from the tower, it will be appreciated that hydrodynamic forces may tend to push the apparatus into damaging bumping contact with the relatively delicate tower legs or braces and struts. However, since the apparatus has been previously pivoted away from adjacency with the tower 20 this possibility is effectively minimized.

One or more tugs 300 then tow the transport and launch apparatus 100 a short distance away from the tower 20. Once the transport and launch apparatus 100 is out of the immediate vicinity of the tower 20, it may be refloated by the blowing ballast chambers 194, 198, 190 and 186 (note FIG. 22A). The refloating movement is depicted by directional arrow G in FIG. 22B.

Subsequent to refloating the transport and launch apparatus the ballast chambers may be blown or deballasted to a proper trim for transportation of the apparatus back to the graving dock for subsequent reuse.

The offshore tower 20 is completed by adding a platform structure 40 as previously discussed and inserting, driving and grouting permanent piles 64 through the pile guides 66.

SUMMARY OF THE MAJOR ADVANTAGES OF THE INVENTION

From the foreoing detailed description it will be appreciated that first and second generally tuning form-shaped buoyancy members are combined to form a transport and launch apparatus which may be connected to an offshore tower for advantageously transporting and launching the offshore tower, and then recovering the transport and launch apparatus for subsequent reuse. The recovery operation not only provides a considerably saving in structural steel, but significantly removes weight from the tower structure that may be detrimental in the event of seismic loading of the tower and also in the event of impingement of strong hydrodynamic forces of the sea.

Further, utilization of the subject transport and launch apparatus in the general sequence as described will enable an offshore tower to be transported and launched into a generally vertical posture with a minimum of hazard to equipment and personnel during the launching operation.

By the provision of the sloping truncated A-shaped character of the transport and launch apparatus transporting the offshore tower through the body of water is facilitated in that the structure will not tend to rotate broadside during the towing operation. Moreover towing is facilitated by the provision of cone-shaped caps on the free ends of the transport and launch apparatus.

Because the transport and launch apparatus is designed to be fixed in a contiguous posture along a lateral surface of the offshore tower, a minimum of structure is required to connect the flotation portion of the transport and launch apparatus with the tower.

Additionally, the transport and launch structure per se is designed to be highly rugged to withstand considerable hydrodynamic forces of the sea. More specifically the central columnar structure interconnecting internal bulkheads permits a reduction in steel utilized while maximizing the strength of the tubular columns and bulkheads. Moreover normally extending structural key columns at the junctions of the unitary tubular portions with the bifurcated tubular portions provides structural rigidity against torsional and flexural forces.

Further by the provision of the pivotal connection of the transport and launch apparatus with the base of the offshore tower the apparatus may be pivoted away from adjacency with the upper portion of the offshore tower prior to completely releasing the transport and launch apparatus thus minimizing the possibility of hydrodynamic forces pushing the transport and launch apparatus into damaging bumping contact with an upper portion of the offshore tower.

While the invention has been described with reference to preferred embodiments it will be appreciated by those skilled in the art that additions, deletions, modifications and substitutions or other changes not specifically described may be made which will fall within the purview of the appended claims.

What is claimed is:

1. An apparatus for transporting an offshore tower, of the type having inwardly and upwardly sloping legs, generally upon the surface of a body of water, controllably righting the offshore tower onto the bed of the body of water at a preselected marine site and controllably releasing the offshore tower at the preselected marine site comprising:

watertight buoyancy means for supporting the offshore tower in a generally horizontal posture substantially above the surface of the body of water;

connecting means extending between said watertight buoyancy means at spaced intervals along the lateral extent of the offshore tower for connecting said watertight buoyancy means to a lateral surface of the offshore tower;

a plurality of bulkheads positioned within the interior of said watertight buoyancy means for dividing said buoyancy means into discrete compartments for facilitating the regulation of buoyancy within said watertight buoyancy means and the righting of the offshore tower onto the bed of the body of water; and said connecting means extending between said watertight buoyancy means and the offshore tower, at a base portion thereof, comprises, at least one pivotal connection assembly having a pivotal axis extending transverse to a central longitudinal axis of the offshore tower so that the means extending between said watertight buoyancy means and the offshore tower may be released with the exception of said at least one pivotal connection assembly and the watertight buoyancy means may pivot away from the inwardly and upwardly sloping legs of the righted offshore tower about the said at least one pivotal connection assembly before the watertight buoyancy member is completely released from the righted offshore tower.

2. An offshore tower transport and launch apparatus comprising:

a first tubular buoyancy member including, a unitary tubular section, and a bifurcated tubular section connected to said unitary section at one end thereof;

means for releasably connecting said first tubular buoyancy member to at least one leg of an offshore tower;

a second tubular buoyancy member including, a unitary tubular section, and a bifurcated tubular section connected to said unitary section at one end thereof;

means for releasably connecting said second tubular buoyancy member to at least another leg of the offshore tower;

means transversely interconnecting said first and second tubular buoyancy members at spaced intervals along the length of said first and second tubular buoyancy sections; and means connected to said first and second tubular buoyancy members for operably controlling the buoyancy thereof, whereby an offshore tower may be transported to a marine site in a generally horizontal posture substantially above the surface of a body of water and launched at the preselected marine site into a generally vertical posture onto the bed of the body of water.

3. An offshore tower transport and launch apparatus as defined in claim 2 wherein said transversely interconnecting means comprise:

spanning between said first and second tubular buoyancy members at selected locations along the length thereof; and means connected to each of said transverse tubular buoyancy members for controlling the buoyancy thereof.

4. An offshore tower transport and launch apparatus as defined in claim 2 wherein:

said means transversely interconnecting said first and second tubular buoyancy members at intervals along the lengths thereof are fashioned having progressively increasing longitudinal lengths whereby said first and second tubular buoyancy members are mutually inwardly inclined.

5. An offshore tower transport and launch apparatus as defined in claim 2 wherein:

each of said unitary tubular sections, at the free ends thereof, are provided with cone shaped nose sections.

6. An offshore tower transport and launch apparatus as defined in claim 2 wherein the bifurcated tubular portions of said first and second tubular buoyancy members each comprise:

generally parallel spaced tubular buoyancy members joined at one of the ends thereof by a generally transverse member which in turn is joined in approximately a mid portion thereof to one end of the unitary tubular section of one of the tubular buoyancy members.

7. An offshore tower transport and launch apparatus as defined in claim 6 wherein said generally transverse member of each of said bifurcated tubular sections comprises:

first and second sloping legs connected at one of the ends thereof to one each of the spaced generally parallel tubular legs of the bifurcated section and having axes of said sloping legs intersecting a longitudinal axis of a corresponding unitary tubular section with a mutually equal angular relationship; and a cylindrical structural key extending through the junction of said sloping legs and said unitary tubular portion and having an axis thereof extending normal to the axes of the unitary tubular portion and each of said sloping legs at the intersection of said axes.

8. An offshore tower transport and launch apparatus as defined in claim 2 wherein:

each of said first and second tubular buoyancy members are provided with a plurality of transversely extending bulkheads at longitudinally spaced locations along the length thereof for facilitating the regulation of buoyancy within the transport and launch apparatus.

9. An offshore tower transport and launch apparatus as defined in claim 8 and further comprising:

a unitary columnar member coaxially extending within each of said first and second tubular buoyancy members between adjacent bulkheads.

10. An offshore tower transport and launch apparatus as defined in claim 2 wherein said means for releasably connecting comprises at least:

pivotal connecting means extending between base portions of the offshore tower and lowermost portions of each of said bifurcated tubular sections.

11. An apparatus for transporting an offshore tower generally upon the surface of a body of water and controllably lowering the tower onto the bed of a body of water at a preselected marine site comprising:

a first watertight unitary tubular member having a generally continuous outer shell and a central longitudinal axis;

means for releasably connecting said first watertight tubular member along a lateral portion of at least one leg of an offshore tower;

a first pair of spaced generally coextensive watertight tubular members having generally continuous outer shells and centrally mutually parallel longitudinally extending axes;

means for releasably connecting said first pair of spaced watertight tubular members to a lateral base portion of said at least one leg of the offshore tower;

means connecting between one of the ends of said first pair of spaced tubular members and one end of said first watertight tubular member for forming a generally tuning fork-shaped buoyancy structure;

a second watertight unitary tubular member, connected to said first watertight unitary tubular member, having a generally continuous outer shell and a central longitudinal axis;

means for releasably connecting said second watertight tubular member along a lateral portion of at least a second leg of the offshore tower;

a second pair of spaced generally coextensive watertight tubular members having generally continuous outer shells and central mutually parallel longitudinally extending axes;

means for releasably connecting said second pair of spaced watertight tubular members to a lateral base portion of said at least a second leg of the offshore tower;

means connected between one of the ends of said second pair of spaced tubular members and one end of said second watertight tubular member for forming a generally tuning fork-shaped buoyancy structure and means transversely interconnecting said first and second unitary tubular buoyancy members.

12. An apparatus as defined in claim 11 wherein said means connecting each of said first pair of said second pair of spaced generally coextensive watertight tubular members to a corresponding first and second watertight unitary tubular member comprises:

a first watertight tubular connecting member, having a continuous outer shell and a central longitudinal axis, connected at one end thereof to one end of one of said pair of spaced tubular members and connected at the other end thereof to said unitary tubular member in an inclined posture wherein the central longitudinal axis of said first watertight tubular connecting member intersects the longitudinal axis of said unitary tubular member at an angle of approximately 120°; and a second watertight tubular connecting member, having a continuous outer shell and a central longitudinal axis, connected at one end thereof to one end of the other one of said pair of spaced tubular members and connected at the other end thereof to said unitary tubular member in an inclined posture wherein the central longitudinal axis of said second watertight tubular connecting member intersects the intersection, of the central longitudinal axis of said first watertight tubular member with the central longitudinal axis of said unitary watertight tubular member, at an angle of approximately 120° with respect to the central longitudinal axis of each of said first watertight connecting member and said unitary tubular member.

13. Apparatus as defined in claim 12 and further comprising:

a tubular structural key extending through the intersection of said central axes of said unitary tubular member and said first and second tubular connecting members, said structural key having a central longitudinal axis extending normal to the axes of the tubular members at the point of intersection thereof; and a plurality of bulkheads one extending between each of the intersecting ends of said tubular members and structural key.

14. An apparatus as defined in claim 11 wherein said means for releasably connecting the first and second pair of spaced generally coextensive watertight tubular members with a lateral base portion of at least a first and at least a second leg of an offshore tower comprises:

a pivotal connection means extending between said first pair of spaced generally coextensive watertight tubular members and said at least a first leg of the offshore tower; and a pivotal connection means extending between said second pair of spaced generally coextensive watertight tubular members and said at least a second leg of the offshore tower.

15. An apparatus as defined in claim 11 and further comprising:

a plurality of transversely extending tubular buoyancy chambers interconnecting said first and second unitary watertight tubular members; and a plurality of transversely extending tubular buoyancy chambers interconnecting said first and second pair of spaced generally coextensive watertight tubular members.

16. An apparatus as defined in claim 15 wherein:

said longitudinal extent of the transverse tubular members connected between the unitary tubular members at the end remote from said pair of spaced tubular members is less than at the end adjacent said pair of spaced tubular members whereby the apparatus in plan view generally assumes a truncated A-shaped configuration.

17. An apparatus as defined in claim 11 wherein:

said first and second tubular watertight members are each provided with a plurality of transversely extending bulkheads laterally spaced along the length thereof for assisting in controllably regulating the buoyancy of the apparatus.

18. An apparatus as defined in claim 17 and further comprising:

a unitary columnar member coaxially extending within each of said first and second watertight unitary tubular members along the length thereof.

19. An apparatus as defined in claim 17 and further comprising:

at least one bulkhead in each of the tubular members of said first pair and said second pair of spaced generally coextensive watertight tubular members.

20. A method for transporting and launching an offshore tower comprising the steps of:

floating an offshore tower in a generally horizontal posture to a preselected marine site upon a buoyancy means connected to the lateral surface thereof;

ballasting said buoyancy means to lower the offshore tower into the body of water and into a generally vertical posture resting upon the bed of the body of water;

releasing the buoyancy means from connection along the lateral extent of the offshore tower while maintaining a pivotal connection between a lowermost portion of the buoyancy means and a base portion of the offshore tower;

pivoting the buoyancy means, about the pivotal connection between a lowermost portion of the buoyancy means and a base portion of the offshore tower, away from the offshore tower; and completely releasing the buoyancy means from the offshore tower at the pivotal connection and towing the buoyancy means away from the offshore tower.

21. A method for transporting and launching an offshore tower as defined in claim 20 and further comprising, prior to pivoting the buoyancy means about the base of the offshore tower, the step of:

deballasting the buoyancy means to generally a neutral buoyancy condition.

22. A method for transporting and launching an offshore tower as defined in claim 20 and further comprising, following the step of completely releasing, the steps of:

deballasting the buoyancy means to raise the buoyancy means to the surface of the body of water; and simultaneously towing the buoyancy means away from the offshore tower resting upon the bed of the body of water.

23. A method for transporting and launching an offshore tower comprising the steps of:

floating an offshore tower generally in a horizontal posture to a preselected marine site upon a first and second tubular buoyancy means connected along the lateral extent thereof to at least a first and second leg of the offshore tower respectively, wherein each of said first and second buoyancy means includes a unitary tubular section and a bifurcated tubular section connected at one end to the unitary tubular section;

at least partially flooding said first and second tubular buoyancy means wherein the bifurcated tubular section of one of said first and second tubular buoyancy means is flooded at a greater rate than the other of said bifurcated tubular section of the other of said first and second tubular buoyancy means, for inducing a roll of the offshore tower approximately about a central longitudinal axis of the offshore tower and into the body of water;

flooding the bifurcated tubular section or the other of said first and second tubular buoyancy means to at least equal buoyancy with the one bifurcated tubular section to even the ballast between the first and second bifurcated tubular sections of the buoyancy means, for inducing a counterroll of the offshore tower approximately about a central longitudinal axis of the offshore tower and into the body of water;

flooding at least a portion of said unitary tubular portions of said first and second tubular buoyancy means to pitch the offshore tower into a generally vertical posture within the body of water; and lowering the righted offshore tower onto the bed of a body of water.

24. A method for transporting and launching an offshore tower as defined in claim 23 and further comprising, following said step of lowering, the step of:

removing the first and second tubular buoyancy means from the lateral surface of the offshore tower for subsequent reuse.

25. A method for transporting and launching an offshore tower as defined in claim 24 wherein said stop of removing comprises:

releasing the first and second tubular buoyancy means along the lateral extent thereof from the lateral surface of the offshore tower;

deballasting a generally neutral buoyancy the first and second tubular buoyancy means;

pivoting the first and second buoyancy means about a pivotal base connection thereof with the offshore tower;

releasing the pivotal connection between the first and second tubular buoyancy means and the base of the offshore tower; and towing the first and second tubular buoyancy means away from the offshore tower.

26. A method for transporting and launching an offshore tower as defined in claim 25 and further comprising, following said step of towing, the step of:

deballasting the first and second tubular buoyancy means to raise said means to the surface of the body of water for horizontally towing the buoyancy means within the body of water back to a tower fabircation facility.

27. A method for transporting and launching an offshore tower comprising:

floating an offshore tower in a generally horizontal posture to a preselected offshore site resting upon a first and second tubular buoyancy means connected along the lateral extent of the offshore tower, wherein each of said first and second buoyancy means includes a unitary tubular section and a bifurcated tubular section connected at one end thereof and said first and second tubular buoyancy means being interconnected by a plurality of transversely extending tubular buoyancy members;

flooding each of said plurality of transverse tubular members for lowering the profile of the horizontally disposed offshore tower with respect to the body of water;

flooding at least the interior ones of the bifurcated tubular sections of the first and second tubular buoyancy means to further lower the profile of the generally horizontally disposed offshore tower within the body of water;

flooding at least a portion of the unitary legs of said first and second tubular buoyancy means to pitch the offshore tower into a generally vertical posture within the body of water;

lowering the righted offshore tower onto the bed of the body of water;

pinning the offshore tower to the bed of the body of water;

pivoting the first and second tubular buoyancy means away from the lateral surface of the offshore tower about a pivotal connection between a base portion of the offshore tower and a base portion of the first and second tubular buoyancy means; and removing the first and second tubular buoyancy means from the offshore tower for subsequent reuse.

28. A method for transporting and launching an offshore tower as defined in claim 27 and further comprising, prior to said step of pivoting, the steps of:

releasing lateral connections except base pivotal connections between the first and second tubular buoyancy means and the offshore tower; and deballasting the first and second tubular buoyancy means sufficiently to induce pivoting of the first and second tubular buoyancy means about the base pivotal connections into a generally vertical posture within the body of water and away from the lateral surface of the offshore tower.

29. A method for transporting and launching an offshore tower as defined in claim 28 wherein said step of removing comprises:

releasing the pivotal connection between the base of the offshore tower and the first and second tubular buoyancy means; and towing the first and second tubular buoyancy means away from the offshore tower.

30. A method for transporting and launching an offshore tower as defined in claim 28 and further comprising, following said step of deballasting, the step of:

pulling the first and second tubular buoyancy means for pivoting said buoyancy means away from the offshore tower.

*31. An apparatus for facilitating a righting operation of an offshore tower, of the type having inwardly and upwardly sloping legs, onto the bed of a body of water at a preselected marine site and controllably releasing the apparatus from the offshore tower at the preselected marine site, said apparatus comprising:*

*watertight buoyancy means;*

*connecting means extending between said watertight buoyancy means and adjacent lateral portions of the offshore tower at spaced intervals along the extent of the buoyancy means for connecting said watertight buoyancy means to a lateral surface of the offshore tower; and*

*said connecting means extending between said watertight buoyancy means and the offshore tower, at a base portion of said buoyancy means comprises at least one pivotal connection assembly having a pivotal axis extending transverse to a central longitudinal axis of the offshore tower so that the means extending between said watertight buoyancy means and the offshore tower may be released with the exception of said at least one pivotal connection assembly and the watertight buoyancy means may pivot away from the inwardly and upwardly sloping legs of the righted offshore tower about the said at least one pivotal connection assembly before the watertight buoyancy means is completely released from the right offshore tower.*

*32. A method for facilitating righting of an offshore tower, of the type having inwardly and upwardly sloping legs, onto the bed of a body of water at a preselected marine site and controllably releasing the apparatus from the offshore tower at the marine site, said method comprising the steps of:*

*righting the offshore tower into a generally vertical posture within the body of water utilizing at least one watertight buoyancy means;*

*releasing said watertight buoyancy means from connection along a lateral portion of the offshore tower while maintaining a pivotal connection between a lowermost portion of the buoyancy means and an adjacent portion of the offshore tower;*

*pivoting the buoyancy means, about the pivotal connection between a lower most portion of the buoyancy means and an adjacent portion of the offshore tower, away from the offshore tower; and*

*completely releasing the buoyancy means from the offshore tower at the pivotal connection and towing the buoyancy means away from the offshore tower.*

* * * * *